United States Patent [19]

Cangelosi

[11] Patent Number: 5,220,730
[45] Date of Patent: Jun. 22, 1993

[54] ADJUSTABLE ALIGNMENT DEVICE

[76] Inventor: Andrew A. Cangelosi, 960 Mountain Ave., Mountainside, N.J. 07092

[21] Appl. No.: 905,358

[22] Filed: Jun. 29, 1992

[51] Int. Cl.$^5$ .................. G01B 5/25; B23Q 16/00
[52] U.S. Cl. ........................ 33/573; 33/533; 33/568; 33/549
[58] Field of Search ............ 33/573, 501.05, 533, 33/645, 549, 551, 568, 569, 570

[56] References Cited

U.S. PATENT DOCUMENTS

| | | | |
|---|---|---|---|
| 2,761,217 | 9/1956 | King | 33/533 |
| 3,895,446 | 7/1975 | Orlov et al. | 33/533 |
| 4,575,942 | 3/1986 | Moriyama | 33/568 |
| 4,596,076 | 6/1986 | Sigg | 33/573 |
| 5,044,088 | 9/1991 | Peucker | 33/573 |
| 5,107,599 | 4/1992 | Marincic et al. | 33/573 |
| 5,142,791 | 9/1992 | Kobayashi et al. | 33/573 |

Primary Examiner—William A. Cuchlinski, Jr.
Assistant Examiner—C. W. Fulton
Attorney, Agent, or Firm—Ezra Sutton

[57] ABSTRACT

An adjustable alignment device is provided, which includes two workpiece-receiving members which are movable relative to each other to support a workpiece, so that it may be horizontally aligned with the cross hairs of a comparator.

10 Claims, 2 Drawing Sheets

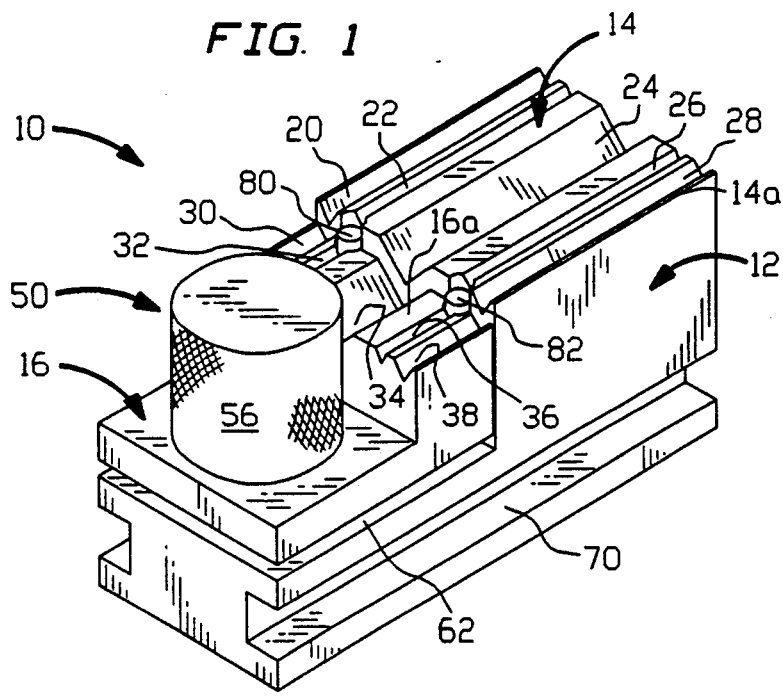
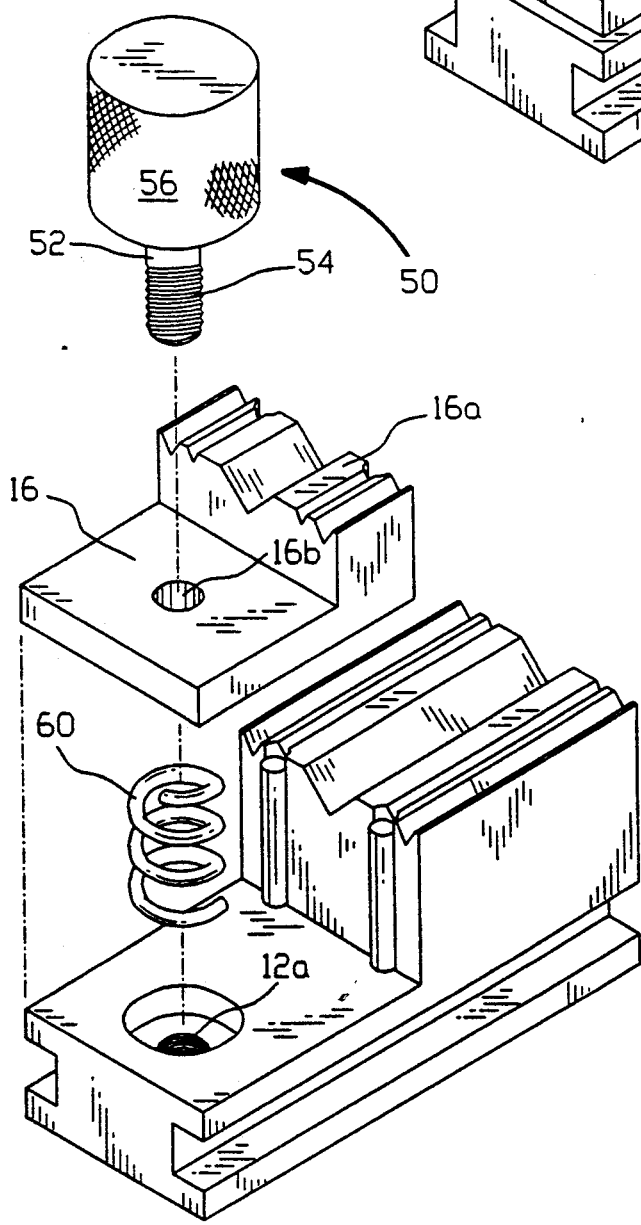

ADJUSTABLE ALIGNMENT DEVICE

FIELD OF THE INVENTION

The present invention relates to an adjustable alignment device used in conjunction with a comparator to measure workpieces, such as screw-machined parts.

BACKGROUND OF THE INVENTION

A workpiece to be measured is supported on a workholder, and the workpiece must be aligned so that it is exactly horizontal. This is done by adjusting the workpiece on the workholder until it lines up with the cross hairs of a comparator. Typically, the workpiece does not have a uniform or symmetrical configuration, and it is necessary to find ways of supporting portions of the workpiece so that it will stay in place on the workholder aligned with the cross hairs of the comparator so that the workpiece may be accurately measured. In many cases, it is necessary to improvise devices for holding the workpiece so it is aligned with the cross hairs while the measurements are being made. However, this is a time-consuming and costly process.

Accordingly, it is an object of the present invention to provide a workholder which is adjustable so that the workpiece to be measured may be quickly and accurately aligned with the cross hairs of the comparator.

It is a further object of the present invention to provide an adjustable workholder which can accommodate workpieces of many different shapes and configurations.

SUMMARY OF THE INVENTION

In accordance with the principles of the present invention, there is provided an adjustable alignment device, which includes a frame member having a first workpiece-receiving member, and a second workpiece-receiving member movable relative to said first workpiece-receiving member. First grooves are formed on the first workpiece-receiving member for receiving a first portion of a workpiece, and second grooves are formed on the second workpiece-receiving member for receiving a second portion of the workpiece. A screw member passes through the second workpiece-receiving member and engages the frame member for moving the second workpiece-receiving member relative to the first workpiece-receiving member until the first and second portions of the workpiece are in horizontal alignment. A spring member surrounds the screw member and is disposed between the frame member and the second-workpiece receiving member for keeping the second workpiece-receiving surface spaced from the frame member.

In another embodiment of the invention, different diameter workpiece-receiving holes are also formed in the workpiece-receiving members for supporting a workpiece to be measured.

BRIEF DESCRIPTION OF THE DRAWINGS

Further objects, features, and advantages of the present invention will become apparent upon the consideration of the following detailed description of the presently-preferred embodiment when taken in conjunction with the accompanying drawings, wherein:

FIG. 1 is a perspective view of an adjustable alignment device in accordance with the present invention;

FIG. 2 is a perspective view of the frame member, with one of the workpiece-receiving members removed for purposes of clarity;

DESCRIPTION OF PREFERRED EMBODIMENTS

Figure 3:
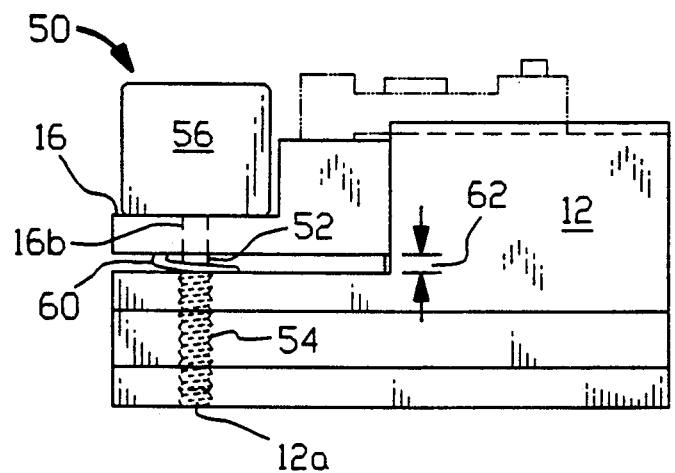
FIG. 3 is a side elevational view of the device of the present invention, with a workpiece to be measured positioned on the device.

Referring to the drawings, there is shown an adjustable alignment device 10 embodying the present invention. The device 10 includes a frame member 12 having a first workpiece-receiving member 14 and a second workpiece-receiving member 16 movable relative to member 14. Grooves 20, 22, 24, 26, and 28 are formed on the upper surface 14a of member 14, and grooves 30, 32, 34, 36, and 38 are formed on the upper surface 16a of member 16 for receiving a workpiece 40 having portions 42 and 44. Preferably, the device 10 is formed of carbon steel.

Grooves 20, 22, 24, 26, and 28, as well as grooves 30, 32, 34, 36, and 38, preferably have a V-shape cross section in order to receive workpiece 40. Of course, other shapes may also be employed. In addition, although 5 sets of grooves are shown on members 14 and 16, it should be understood that more or less grooves can be employed, as desired. Further, the sizes of the grooves may be varied, as desired, depending on the sizes of the workpieces to be employed.

A screw member 50 includes a shaft 52 having threads 54 and a knob 56. Shaft 52 passes through a hole 16b formed in member 16, and threads 54 of screw member 50 are threadedly engaged in a threaded hole 12a formed in frame member 12. Preferably, screw member 50 has 24 to 32 threads per inch. A spring 60 surrounds shaft 52 and is disposed between frame member 12 and workpiece-receiving member 16 for maintaining the spacing therebetween. Preferably, spring 60 is formed of copper or steel.

Frame member 12 includes a first side groove 70 and a second side groove 72 for receiving a clamp to clamp the workpiece onto one of the members 14 or 16.

Frame member 12 also includes guide pins 80 and 82 for guiding workpiece-receiving member 16 relative to workpiece-receiving member 14. Guide pins 80 and 82 are mounted on frame member 12 between members 14 and 16. Guideways are formed in members 14 and 16, so that member 16 may move along guide pins 80 and 82.

In operation, workpiece 40 is placed on workpiece-receiving members 14 and 16, and because of its odd shape, it is held in position by hand until member 16 is adjusted. Depending on the size of workpiece 40, it is placed in one of the grooves 20, 22, 24, 26, and 28 on member 14 and in one of the grooves 30, 32, 34, 36, and 38 on member 16. Knob 56 is turned so that member 16 is lowered relative to member 14. In this manner, the large portion 42 of workpiece 40 is lowered, so that workpiece 40 rests on members 14 and 16 in a stable manner, as shown. Spring 60 maintains the spacing 62, as shown. At this point, a fine adjustment of knob 56 is made to line up a selected surface of workpiece 40 with the cross hairs of the comparator. When this is done, workpiece 40 is accurately positioned horizontally so that it is ready to be measured.

Figure 4:
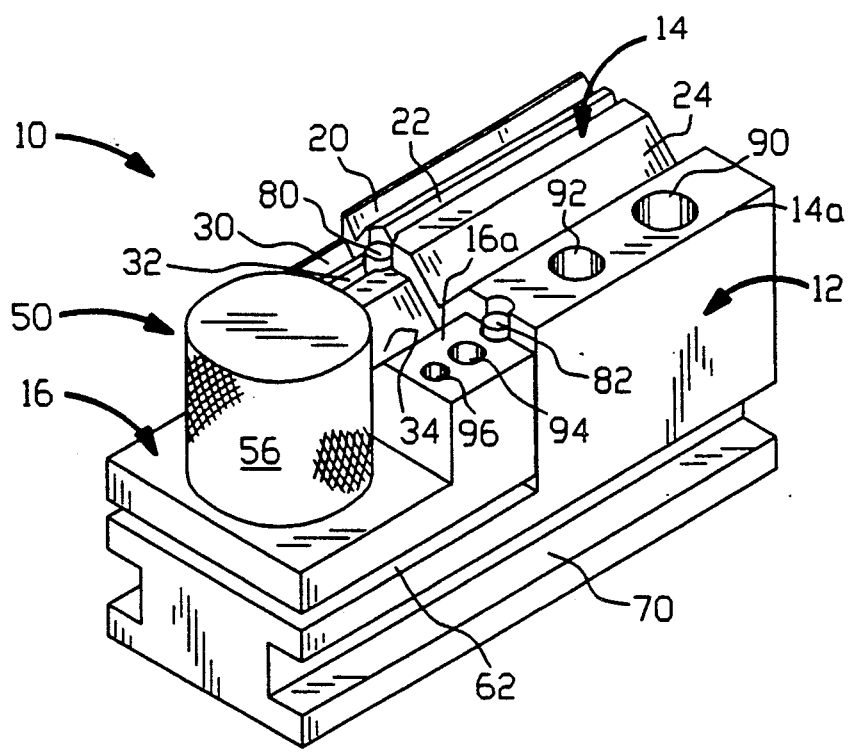
FIG. 4 is a perspective view of another embodiment of the invention.

FIG. 4 shows another embodiment of the invention, wherein less grooves are employed, and instead, different diameter workpiece-receiving holes 90, 92, 94, and 96 are formed in workpiece-receiving members 14' and 16'. For example, the holes may vary in size from ⅛" to ⅞". In this manner, as shown, the workpiece 40' may be placed in holes 90 and 96 in order to hold it in position to be aligned and measured, as explained above.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. An adjustable alignment device, comprising:
   a) a frame member having a first workpiece-receiving member;
   b) a second workpiece-receiving member movable relative to said first workpiece receiving member;
   c) first grooves formed on said first workpiece-receiving member for receiving a first portion of a workpiece and second grooves formed on said second workpiece-receiving member for receiving a second portion of said workpiece;
   d) a screw member passing through said second workpiece-receiving member and engaging said frame member for moving said second workpiece-receiving member relative to said first workpiece-receiving member until said first and second portions of said workpiece are in horizontal alignment; and
   e) a spring member surrounding said screw member and disposed between said frame member and said second-workpiece receiving member for keeping said second workpiece-receiving member spaced from said frame member.

2. A device in accordance with claim 1, wherein said first and second workpiece-receiving members have workpiece-receiving holes formed therein for receiving said workpiece.

3. A device in accordance with claim 1, wherein said frame member, said first workpiece-receiving member, and said second workpiece-receiving member are formed of carbon steel.

4. A device in accordance with claim 1, wherein said frame member includes grooves for receiving a clamp to clamp said workpiece onto one of said first and second workpiece-receiving members.

5. A device in accordance with claim 1, wherein said frame member includes guide pins for guiding said second workpiece-receiving member relative to said first workpiece-receiving member.

6. A device in accordance with claim 1, wherein there are three grooves formed on each of said first and second workpiece-receiving members.

7. A device in accordance with claim 1, wherein there are five grooves formed on each of said first and second workpiece-receiving members.

8. A device in accordance with claim 1, wherein said screw member includes 24 threads per inch.

9. A device in accordance with claim 1, wherein said screw member includes a knob for turning said screw member.

10. A device in accordance with claim 1, wherein said first and second workpiece-receiving members have a plurality of different diameter workpiece-receiving holes formed therein for receiving said workpiece.

* * * * *